May 9, 1961   W. W. MORGAN   2,983,147
FLUID SAMPLING APPARATUS
Filed May 6, 1957   3 Sheets-Sheet 1

INVENTOR.
WILLARD W. MORGAN
BY
ATTORNEYS

May 9, 1961 W. W. MORGAN 2,983,147
FLUID SAMPLING APPARATUS
Filed May 6, 1957 3 Sheets-Sheet 2
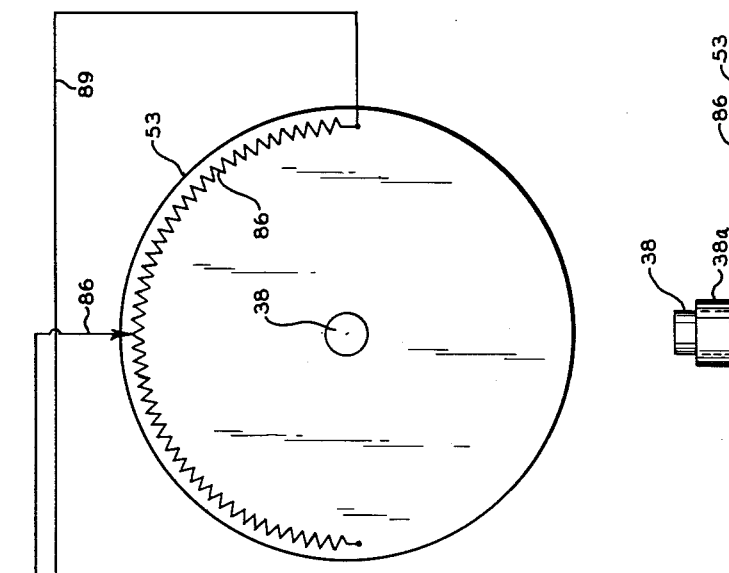
FIG. 2
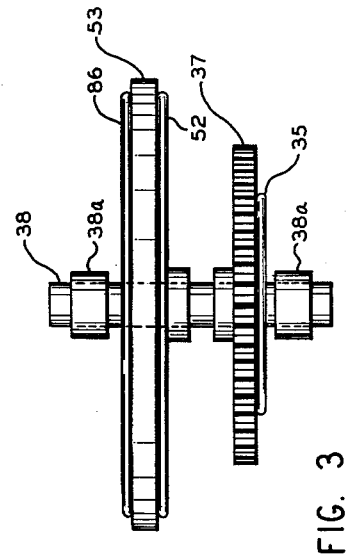
FIG. 3
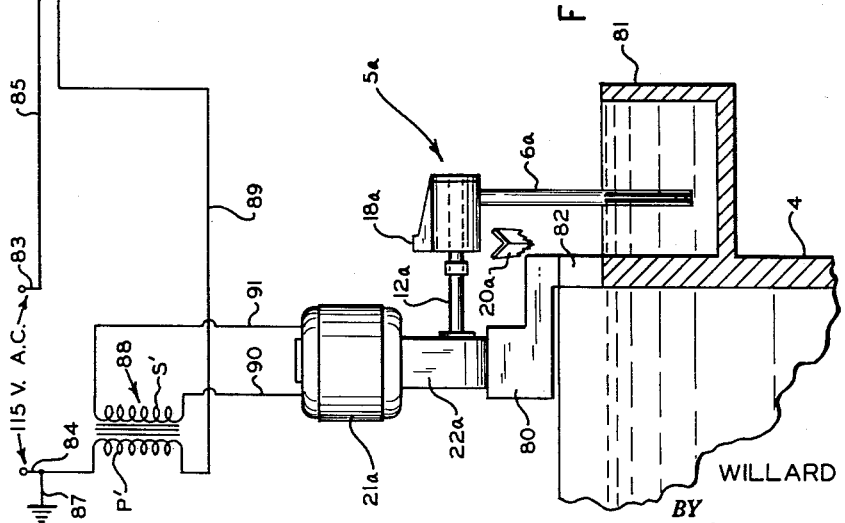
INVENTOR.
WILLARD W. MORGAN
BY
*Kerman & Kerman*
ATTORNEYS

United States Patent Office 2,983,147
Patented May 9, 1961

2,983,147
FLUID SAMPLING APPARATUS
Willard W. Morgan, 1621 Benjamin St., Saginaw, Mich.
Filed May 6, 1957, Ser. No. 657,258
13 Claims. (Cl. 73—424)

This invention relates to mechanical apparatus for sampling flowing fluids and more particularly to fluid sampling apparatus operable to take samples in proportion to the rate of flow of the fluid:

Mechanical sampling apparatus is particularly desirable in sewage disposal plants and other installations where frequent samplings are required by law where the rate of flow of the fluid to be sampled varies between wide limits, but the disadvantages of mechanical apparatus known heretofore have so outweighed their advantages that relatively little use has been made of them. One of the chief disadvantages of known mechanical sampling apparatus has been the inability to take samples in true proportion to the rate of flow. Some of the known mechanical equipment collects samples at regular intervals, the size of the sample varying with the quantity of fluid then flowing, but such aparatus is unable to reflect sudden surges in the flow and, unless the timing of operation of the apparatus happens to coincide with a sudden surge of concentrated contamination, the contamination may pass the sampling point before the aparatus includes it in its sample. In this event the sample taken will not be a true reflection of the character of the flowing fluid, and it is not uncommon for the daily report of a sampling station to be at considerable variance with the true character of the fluid which flows through the station.

Another type of known mechanical sampling apparatus operates continuously at substantially constant speed irrespective of the rate of fluid flow. Such equipment will detect and sample a sudden surge of contamination, provided its cycle of operation is fast enough, but since it samples at a substantially constant rate, the accumulated sample at the end of a given period of time will not always be a truly composite sample inasmuch as no more samples are taken at abnormal flow conditions than are taken at normal flow conditions.

In all of the heretofore known types of mechanical sampling apparatus, difficulty was experienced in keeping the apparatus clean. The cleaning of such apparatus is a laborious, time-consuming and unpleasant task, and does not promote the use of mechanical sampling apparatus.

As a result of the disadvantages of known mechanical sampling apparatus, particularly those proposed for use in sewage treating plants, the sampling is largely a manual task which produces, at best, only an approximation of the daily flow and is generally no more accurate than the mechanical apparatus referred to above.

An object of this invention is to provide improved apparatus for sampling fluid in direct proportion to its rate of flow.

Another object of the invention is to provide fluid sampling apparatus operable in accordance with the rate of fluid flow and capable of taking samples of substantially constant quantity irrespective of the rate of flow so that accumulated samples for a given period of time reflect the character of the flowing fluid and also serve as a measure of the quantity of fluid flowing through the system.

A further object of the invention is to provide apparatus of the kind referred to which is operable to sample fluid in accordance with its rate of flow under normal contamination conditions and which is operable automatically to cease sampling during abnormal contamination conditions for a period of time sufficient to permit the abnormality to clear the sampling zone.

A further object of the invention is to provide mechanical sampling apparatus which is easily and quickly cleanable.

Other objects and advantages of the invention will be pointed out specifically or will become apparent from the following description when it is considered in conjunction with the appended claims and the accompanying drawings, in which:

Figure 2 is a diagrammatic view of apparatus generally similar to that shown in Figure 1, but being of such construction as to be operable in a location other than the location in which the apparatus shown in Figure 1 is operable;

Figure 3 is a fragmentary, top plan view of apparatus incorporated in the structure disclosed in Figures 1 and 2;

Figure 1:
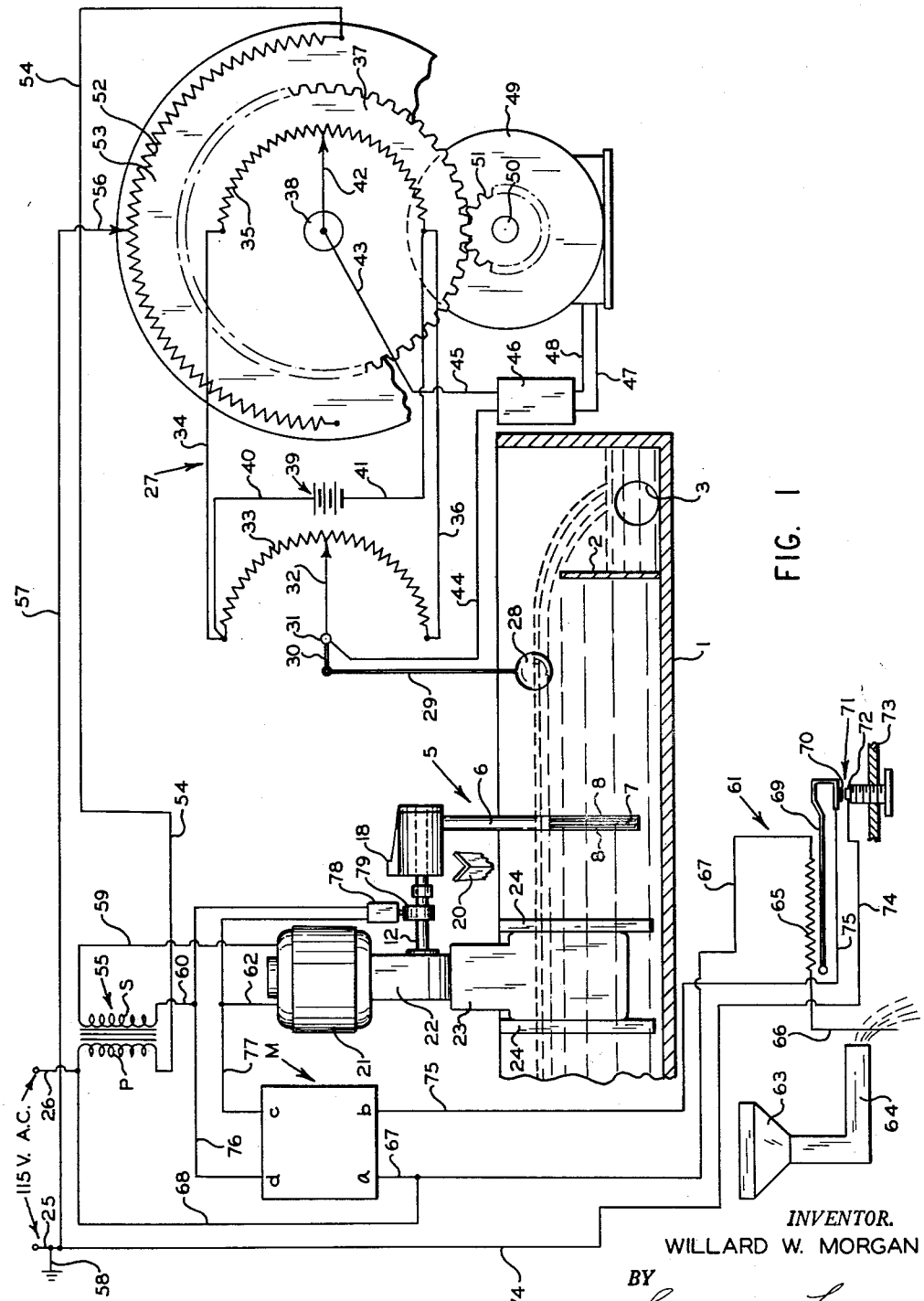
Figure 1 is a diagrammatic view disclosing sampling apparatus constructed in accordance with the invention.
Figure 5:
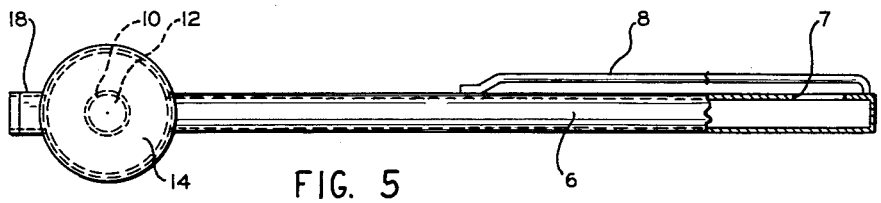
Figure 5 is a front elevational view of the structure shown in Figure 4.
Figure 4:
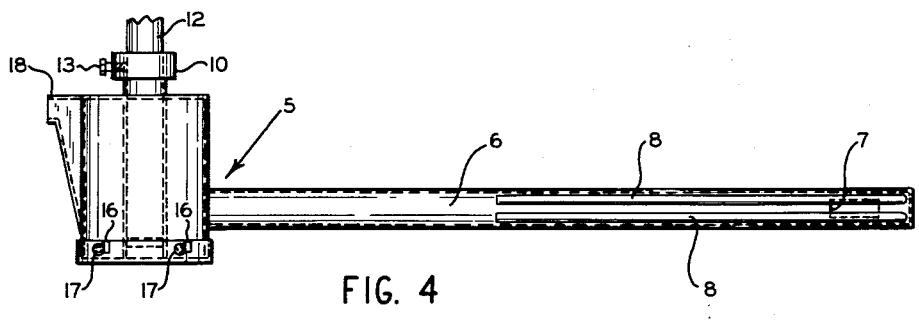
Figure 4 is an enlarged, fragmentary top plan view of a portion of the apparatus shown in Figures 1 and 2.
Figure 6:
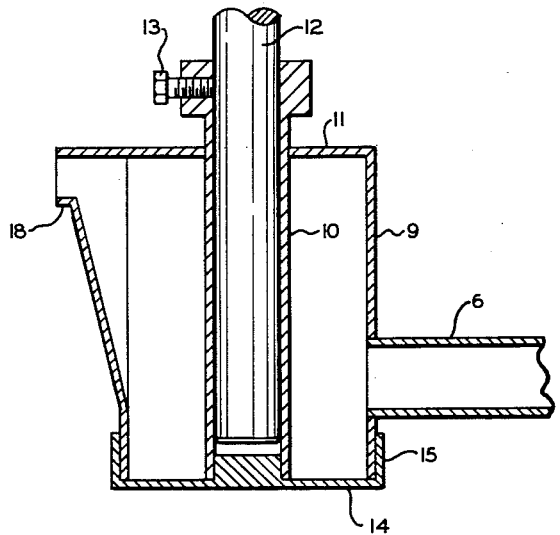
Figure 6 is an enlarged, fragmentary, partly sectional and partly elevational view of the structure shown in Figures 4 and 5.

For convenience, apparatus formed in accordance with the invention will be described with reference to a sewage treating installation, but it should be understood that the apparatus is useful in any instance where fluid flowing through a fluid system should be sampled in accordance with the rate of fluid flow.

In most sewage treating stations, sewage is pumped from the sewers to the station where it is picked and screened for the removal of trash and grit, and thence pumped through a series of settling or clarifying tanks in which solids and impurities are permitted to settle, the latter being delivered to incinerator, and the processed fluid in the final settling tank being treated with chemicals and discharged from the treating station to a river, lake, or the like. Ony those portions of a sewage treating station having a direct bearing on the invention are disclosed in the drawings and include a weir stilling box or tank 1 into which fluid which has been screened and picked is pumped from the pump house, this fluid hereinafter being referred to as the influent. The weir tank 1 includes a conventional weir plate 2 therein by means of which the rate of flow of fluid through the system may be determined. On the downstream side of the weir plate 2 the tank 1 is equipped with an outlet 3 through which fluid may be pumped to the clarifying tanks, the final clarifying tank being indicated at 4 in Figure 2 and from which fluid is discharged from the station, this fluid hereinafter being referred to as the effluent.

The sample taking apparatus includes thief means designated generally by the reference character 5 and comprising a hollow, tubular arm 6 adapted to be immersed in the influent. For illustrative purposes the thief is shown in the drawings as being positioned for immersion in the fluid contained in the weir tank 1, but it may be located at one or more other positions. The thief arm 6 has an opening 7 adjacent to the end adapted for immersion in the influent so as to permit fluid to be admitted to the interior of the arm. A suitable number of guards, indicated at 8, screen the opening 7 from large solids. The other end of the thief arm 6 is rigidly connected to a substantially cylindrical receptacle 9 and into which fluid in the tube 6 may drain when the arm is elevated. The receptacle 9 includes an integral sleeve or hub 10 which is rigidly joined to one end wall 11 of the receptacle and is adapted to be removably secured on the end of a driven shaft 12 by means of a set screw or the like 13. The other end of the receptacle 9 is closed by a removable cap 14 having a flange 15 provided with bayonet type slots 16 for reception of studs 17 fixed to the outer surface of the receptacle 9.

At a point on the periphery of the receptacle 9 which is substantially 180° removed from the arm 6 is provided a discharge spout 18 through which fluid delivered to the interior of the receptacle may be discharged to a trough 20 or the like which may be supported in any suitable manner below the receptacle 9 for delivering successive samples to an analysis location.

Referring to Figure 1, means for driving the shaft 12 and, consequently, the influent sampling thief 5, comprises a universal electric motor 21 connected to the shaft 12 through a gear reduction assembly 22, the latter being mounted on a float member 23 located adjacent to one side of the weir tank 1 and being adapted to rise and fall in accordance with the rise and fall of the level of the influent in the weir tank so as to assure that the tube 6 will be immersed to the same depth irrespective of the height of the fluid above the level of the weir plate 2. The float member 23 is guided during its movements by guide elements 24 of any suitable construction.

The thief driving motor 21 is adapted to receive its power from a source of energy such as 115 volt alternating current, but instead of connecting the motor terminals directly to the power lines 25 and 26, control means designated generally by the reference character 27 is interposed between the power source and the motor for regulating the voltage applied across the motor terminals to regulate its speed and hence to regulate the speed at which the thief is driven.

The control means 27 includes a device such as a float 28 located in the weir tank 1 on the upstream side of the weir plate 2 which is responsive to a change in the head of the influent. The float 28 is connected by an arm 29 to a link 30 pivoted as at 31 on a suitable support, the other end of the link 30 constituting a movable contact arm 32 which is in engagement with a resistive slide wire 33, the resistance of which is lineally related to the head of the influent. One end of the slide wire 33 is connected by a wire 34 to the corresponding end of an identical slide wire 35, the other end of the latter being connected by a wire 36, having the same resistance as the wire 34, to the corresponding end of the slide wire 33. The slide wire 33 may be contained in any suitable housing (not shown) whereas the slide wire 35 preferably is mounted on a gear 37 formed of insulating material and fixed to a shaft 38 journalled for rotation in suitable bearings 38a mounted in a support (not shown). A source of direct current energy such as a battery 39 or rectified alternating current is connected by wires 40—41 to the slide wires 33 and 35, respectively, in such manner that the power supply 39 is in parallel with the slide wires and the potential difference across the wire 40 is substantially the same as the potential difference across the wire 41. A contact arm 42 has one of its ends in engagement with the slide wire 35 and its other end mounted on a fixed, insulated support (not shown) at a point in alignment with the longitudinal axis of the shaft 38. Wires 44 and 45 connected to the contact arm 32 and 42, respectively, lead to the input side of an amplifier 46 including means such as a vibrator for converting direct current to alternating current. From the output side of the amplifier 46 extended a pair of wires 47 and 48 which are connected to the terminals of an electric motor 49, the armature shaft 50 of which has secured thereto a driving pinion 51 which meshes with the gear 37 to drive the latter.

The arrangement of the control parts described thus far is such that a change in the head of influent in tank 1 will effect movement of the contact arm 32 from its position as shown in Figure 1. A change in the position of the arm 32 will result in a change in energy supplied to the amplifier 46 through the wire 44 and, consequently, will result in a change in the energy supplied from the amplifier 46 to the motor 49. The change in energy supplied to the motor 49 will cause rotation of the shaft 50 and, consequently, rotation of the gear 37 so as to move the slide wire 35 relatively to the contact arm 42. Movement of the slide wire 35 will continue until such time as the potential difference across the wires 44 and 45 is zero. At this point driving of the shaft 50 will cease and the system again will be in balance.

For simplicity of illustration the actuating means for the control apparatus 27 has been disclosed as a float. It should be understood, however, that the invention is not limited to the use of a float, inasmuch as other types of apparatus may be used, one example of which is a pressure sensitive diaphragm.

The control apparatus 27 also includes a resistive slide wire 52 mounted on one face of an insulated disc 53 which is fixed on the shaft 38. One end of the slide wire 52 is connected by a wire 54 to one terminal of the primary winding P of a stepdown transformer 55, the other terminal of the primary winding P being connected to the power line 26. A stationary contact arm 56 in engagement with the slide wire 52 is connected by a wire 57 to the other power line 25, the latter having a ground connection 58. The transformer 55 includes a secondary winding S having one of its terminals connected by a wire 59 to one of the terminals of the motor 21, the other terminal of the secondary winding S being connected through a wire 60, through motor interrupting apparatus 61 yet to be described, and through a wire 62 to the other motor terminal so as to supply the motor with energy to cause it to drive the thief 5.

When the motor 49 causes the shaft 38 and its associated parts to be rotated in the manner previously disclosed, the slide wire 52 will be moved relatively to the contact arm 56 so as to vary the voltage induced in the secondary transformer winding S, and hence vary the rate at which the motor 21 drives the thief 5.

It previously has been stated that in conventional sewage treating stations, sediment from the clarifying tank is returned to the station for disposal in an incinerator or the like. Prior to its delivery to the incinerator, the sediment or sludge usually is delivered to a large container represented in Figure 1 by the reference character 63 and it sometimes becomes necessary to discharge sludge from the container 63 into the influent. For this purpose the container 63 may include a discharge opening 64 through which sludge may be discharged into some part of the influent line which is upstream from the weir tank 1. This sludge represents a sudden surge of contamination in the influent which is not at normal concentration. Thus, if the abnormally contaminated influent were sampled, the samples obtained would not be truly reflective of the normal influent sewage. Accordingly, the motor interrupting apparatus 61 preferably forms a part of the influent sampling apparatus so as to terminate sampling operations as long as the abnormally concentrated contamination remains in the influent system.

The motor interrupting apparatus 61 includes a heater 65 having connected to one end therof a wire 66 located in the path of sludge discharged from the container 63 and having connected at its other end a wire 67 which leads to one terminal a of a trip-timing mechanism M of known construction. Connected to the wire 67 is a branch wire 68 which leads to the power line 26. Located in a position to be heated by the heater 65 is a bi-metallic strip 69 on which is secured one contact 70 of a normally open switch 71, the other contact 72 being adjustably mounted on a support 73 and being connected by a wire 74 to the other power line 25. From the contacts 70 leads a wire 75 which is connected the terminal $b$ of the trip-timing mechanism M. From opposed terminals $d$, $c$, extend wires 76 and 77, respectively, which are connected to terminals of a switch 78, the contacts of which are opened and closed by a cam 79 mounted on the shaft 12. The wire 77 also is connected to the wire 62 which leads to one of the terminals of the motor 21.

The terminals $d$ and $c$ of the mechanism M normally are closed through a timing device and a switch (not shown) so as normally to permit energy from the secondary winding S of the transformer 55 to be supplied to the motor 21 through the line 59, and through the lines 60, 76, 77 and 62. When sludge is pumped from the container 63, however, the heating element 65 is energized so as to heat the bi-metallic strip 69 and effect closing of the normally open switch 71. The closing of switch 71 energizes a solenoid (not shown) in the trip-timing mechanism M to interrupt the passage of current through the latter. The supply of energy to the motor 21 does not cease necessarily with the closing of the switch 71, however, inasmuch as current will be supplied to the motor 21 through the switch 78 as long as its contacts are maintained closed by the cam 79. The cam is of such construction that it will permit the switch contacts to open when the thief arm 6 extends substantially vertically upwardly, that is, in a position 180° removed from the position shown in Figure 1, so as to assure drainage of the receptacle 9. Thus, the arrangement is such that, when the contacts $d$ and $c$ of the mechanism M are connected, the motor 21 will be driven continuously, but when the flow of current through the mechanism M is interrupted by the trip solenoid, operation of the motor 21 will cease when the thief arm 6 is located in a predetermined position.

When sludge ceases to be discharged from the container 63, the heater 65 will cool, thereby permitting the switch 71 to open. The opening of the switch 71 will deenergize the solenoid in the mechanism M, but energy will not be supplied immediately across the terminals $d$ and $c$. Instead, the deenergization of the trip solenoid actuates a timing mechanism which will delay closing of the switch connecting the contacts $d$ and $c$ for a length of time sufficient to enable the concentrated contamination represented by the sludge discharged from the container 63 to pass the location of the influent sampling apparatus. The time required for this to take place is relatively easily figured and the timing apparatus may be set accordingly. When energy again is supplied to the motor 21 through the trip-timing mechanism M, the apparatus will operate in the manner previously indicated.

The sampling thief means 5 arranged in accordance with the invention operates at a uniform speed so long as the influent flows at a constant rate and so long as the influent contains normal concentration. Any change in the influent rate of flow will be accompanied by a change in the head in the weir tank 1 and the change in head will be communicated by the float 28 or equivalent apparatus to the control mechanism 27 so as to vary infinitely the rate of speed at which the thief 5 is driven in direct proportion to the rate of flow of the influent. A change in head in the weir tank 1 also will be communicated to the thief 5 by means of the float 23, thereby raising or lowering the thief 5 so as to enable the depth of immersion of the tube 6 to be substantially constant, the result of which is that each sample taken by the arm 6 will be of substantially uniform quantity. Thus, samples accumulated over a period of time will be accurately representative of the volume of influent passing the sampling station. If desired, recording apparatus of known construction can be incorporated with the invention for recording the volume of fluid treated. The apparatus will continue to function at speeds in accordance with the rates of flow of the influent until such time as it is disconnected from its power source, except for those instances in which its operation is interrupted by the interrupting mechanism 61 in the manner previously described.

In most, if not all, sewage treating stations, not only is the influent sampled periodically, but also the effluent, so as to provide an indication of the effectiveness of the sewage treating equipment. Accordingly, apparatus constructed in accordance with the invention includes means for sampling the effluent, the effluent sampling means being disclosed in Figure 2 as comprising a thief $5a$ mounted on a shaft $12a$ which is driven by a motor $21a$ through a reduction gear assembly $22a$, these parts being similar to the corresponding parts previously described. The motor and its associated parts may be mounted on a support 80 fixed in any suitable manner to the final clarifying tank 4, the latter having a trough 81 or the like supported on its periphery and into which fluid from the interior of the tank 4 may feed through an opening 82 at the upper end of the wall of the tank 4. The thief $5a$ is so positioned that its sampling tube $6a$ may be immersed in the fluid contained in the trough 81, the level of the fluid in the trough 81 being maintained at a constant height.

It is preferred that the thief $5a$ be driven at a rate in accordance with the rate of flow of effluent from the tank 4, and the rate of flow of the effluent will, of course, be determined by the rate of flow of the influent. Thus, the same control mechanism 27 which regulates the rate of speed at which the influent sampling thief is driven may be utilized in regulating the speed of the effluent sampling arm $5a$. Energy for driving the motor $21a$ is delivered from a source of 115 volt alternating current through a pair of power lines 83 and 84, the former being connected by a wire 85 to a fixed contact arm 86 similar to the arm 56. The other power line 84 is connected to ground through a wire 87 and is also connected to the primary winding P' of a step-down transformer 88 from which extends a wire 89 which is connected to one end of a slide wire 86 similar to the slide wire 52, and which conveniently may be mounted on the opposite face of the insulated disc 53. The secondary winding S' of the transformer 88 is connected by wires 90 and 91 to the terminals of the motor $21a$.

The operation of the apparatus disclosed in Figure 2 is similar to the operation of the previously described influent sampling apparatus, in that the speed at which the thief $5a$ is driven will be governed by the head of fluid in the influent tank 1. Thus vertical movement of the float 28 will effect rotation of the shaft 38 and the disc 53 so as to vary the voltage applied across the terminals of motor 21 to increase or decrease the speed of operation of the thief $5a$. Accordingly, the thief $5a$ will be driven in accordance with the rate of flow of fluid through the system and samples will be discharged from the apparatus $5a$ into a trough $20a$ or the like for delivery to an analysis point. Since there ordinarily will be no abnormal contamination discharged from the final clarifying tank 4, there need be no interruption mechanism associated with the motor $21a$.

One of the common complaints against mechanical sampling apparatus known heretofore is the difficulty with which those parts of the apparatus which contact the fluid may be cleaned. In apparatus formed in accordance with the invention, the only parts which need come in contact with the fluid in the system are the thiefs 5 and $5a$ and the troughs 20 and $20a$ which receive the samples from the thiefs. Due to the construction of each of the thiefs, the latter may be removed from their supporting shafts 12 and $12a$ and be replaced by other similar thiefs so as to enable the removed parts to be cleaned thoroughly at leisure. The troughs 20 and 20a may be removable if desirable, but it is a simple matter to clean them.

The disclosed embodiment is representative of a presently preferred form of the invention but is intended to be illustrative rather than definitive thereof. The invention is defined in the claims.

I claim:

1. Fluid sampling apparatus for sampling fluid at a rate proportional to its rate of flow through a system including a weir tank, said apparatus comprising thief means immersible in said fluid; means mounting said thief means for movement from an immersed, sample taking position to a sample discharging position and return; continuously operating, variable speed driving means connected to said thief means for moving the latter continuously from and to each of said positions; and infinitely variable control means for said driving means, said control means being operable in response to a change in head of fluid in said weir tank for infinitely varying the speed of said driving means.

2. Apparatus as set forth in claim 1 wherein said mounting means is located in said weir tank and includes a float movable in accordance with a change in head of fluid in said weir tank for maintaining the depth of immersion of said thief means substantially constant.

3. Apparatus as set forth in claim 1 wherein said driving means is electrically operated, and wherein said control means includes a variable resistance device affected by a change in head of fluid in said weir tank for varying the supply of power to said driving means.

4. Apparatus as set forth in claim 1 wherein said thief means comprises a hollow tube having an opening therein for the admission of fluid into said tube and a receptacle into which fluid from said tube may drain, said receptacle having a drain opening therein through which fluid may be discharged.

5. Fluid sampling apparatus for sampling fluid at a rate proportional to its rate of flow through a system including a weir tank, said apparatus comprising thief means; means mounting said thief means for movement from an immersed, sample taking position in said fluid system to a sample discharging position and return; continuously operating, variable speed, power driving means connected to said thief means for moving the latter continuously to and from its said positions; means connected to said driving means for supplying the latter with power; means in said weir tank responsive to a change in head of fluid in said weir tank; and infinitely variable control means connected to said responsive means and to said driving means for regulating the supply of power to the latter in accordance with a change in head of fluid in said weir tank.

6. Apparatus as set forth in claim 5 wherein said responsive means comprises a float.

7. Apparatus as set forth in claim 5 wherein said power driving means comprises an electric motor, and said control means comprises variable resistance means connected to said motor for varying the supply voltage of said motor, and wherein said responsive means is connected to said variable resistance means.

8. Fluid sampling apparatus for sampling normally contaminated fluid at a rate proportional to its rate of flow through a system including a weir tank, said system being subject to occasional introduction of an abnormally contaminated fluid, said apparatus comprising thief means immersible in said normally contaminated fluid; means mounting said thief means for movement from an immersed, sample taking position in said normally contaminated fluid to a sample discharging position and return; power driving means for continuously moving said thief means repeatedly from and to its said positions to take repeated samples of normally contaminated fluid in said system; and means connected to said driving means and operated by the introduction of said abnormally contaminated fluid for interrupting operation of said driving means.

9. Apparatus as set forth in claim 8 wherein said driving means includes an electric motor, a cam driven by said motor, and wherein said interrupting means includes switch operated by said cam for interrupting energy supplied to said motor.

10. Apparatus as set forth in claim 9 wherein the interruption by said cam of energy supplied to said motor occurs when said thief means is in its sample discharging position.

11. Fluid sampling apparatus for sampling normally contaminated fluid at a rate proportional to its rate of flow through a system including a weir tank, said system being subject to occasional introduction of an abnormally contaminated fluid, said apparatus comprising thief means immersible in said normally contaminated fluid; means mounting said thief means for movement from an immersed, sample taking position in said normally contaminated fluid to a sample discharging position and return; power driving means for continuously moving said thief means repeatedly from and to its said positions to take repeated samples of normally contaminated fluid in said system; control means for said driving means operable in response to a change in the head of fluid in said weir tank for varying the speed at which said thief means is moved by said driving means; and means connected to said driving means and operated by the introduction of said abnormally contaminated fluid for interrupting operation of said driving means.

12. Apparatus as set forth in claim 11 wherein said mounting means is located in said weir tank and includes a float movable in accordance with a change in head of normally contaminated fluid in said weir tank for maintaining the depth of immersion of said thief means substantially constant.

13. Apparatus as set forth in claim 11 wherein said driving means is power operated, and wherein said control means includes a device affected by a change in head of normally contaminated fluid in said weir tank for varying the supply of power to said driving means.

References Cited in the file of this patent

UNITED STATES PATENTS

| | | |
|---|---|---|
| 1,188,794 | Lawton | June 27, 1916 |
| 1,649,399 | Gard | Nov. 15, 1927 |
| 1,769,308 | Rhodes | July 1, 1930 |
| 1,843,552 | Gibson et al. | Feb. 2, 1932 |
| 1,992,780 | Skeats | Feb. 26, 1935 |
| 2,376,912 | Green | May 29, 1945 |
| 2,476,163 | Trebler | July 12, 1949 |

FOREIGN PATENTS

| | | |
|---|---|---|
| 267,795 | Germany | Dec. 1, 1913 |